United States Patent Office 2,957,752
Patented Oct. 25, 1960

2,957,752

PROCESS FOR INCREASING THE DENSITY OF MAGNESIUM OXIDE

Gunter H. Gloss, Lake Bluff, Ill., assignor to International Minerals & Chemical Corporation, a corporation of New York No Drawing. Filed Dec. 27, 1955, Ser. No. 555,269

9 Claims. (Cl. 23—201)

This invention relates to a process for improving the physical characteristics of sintered magnesium oxide. More particularly, it relates to a process for heat treatment of magnesium oxide to increase the density of the calcined product. Still more particularly, it relates to the effect of incorporating lithium salts into magnesium oxide produced by the decomposition of magnesium chloride under oxidizing conditions before heat treatment thereof.

Magnesium oxides, when used as refractories or as heating element material or similar uses, give optimum service when the heat treated or fused product is of high density and low porosity. Magnesium oxides obtained by the decomposition of magnesium carbonates and by suitable high temperature treatment, are products with acceptable densities for some refractory applications where high purity is not essential. On the other hand, magnesium oxide produced by the decomposition of magnesium chloride, in general, has greater purity, but the heat treated products usually are too porous and of a density rendering them unacceptable for the above uses.

It is a primary object of the instant invention to overcome the shortcomings and disadvantages of the magnesium oxide products heretofore produced by the decomposition of magnesium chloride.

It is another object of this invention to provide a process wherein magnesium oxide is converted during heat treatment to a product of acceptable density.

It is still another object of this invention to provide a process wherein additives render the magnesium oxide susceptible to densification during reasonable heat treatment.

It is still a further object of this invention to provide a process wherein heat treatment at temperatures attainable in apparatus such as rotary kilns is sufficiently high to effect densification.

It is still another object of this invention to provide a process wherein the additives present during preliminary processing are substantially eliminated during final densifying heat treatment.

These and other objects of the invention will be apparent to those skilled in the art from the following description.

In carrying out heat treatment of magnesium oxide powders or compressed pellets thereof, it has been discovered that introduction of lithium salts into the magnesium oxide material prior to hydration produced a mixture which densifies during later firing, substantially all the additive being eliminated during final heat treatment.

Addition of the lithium salts prior to hydration results in the production of a final heat treated product of a density not obtainable by addition of the salt at any subsequent stage of the process or by simple heat treatment alone.

In the preferred mode of operation, magnesium oxide produced by the decomposition of magnesium chloride, under oxidizing conditions and at temperatures of the order of 1370° C. to about 1500° C., is mixed with between about 0.02% and about 0.16% of lithium by weight added as a volatilizable or heat decomposable salt. The mixture is autoclaved to effect hydration of a substantial portion of the magnesium oxide and then the mixture is heat treated as by calcining.

The decomposition of magnesium chlorides may be effected either by firing a powder or by firing pelletized material. This relatively high temperature firing in an oxidizing atmosphere may produce either a material of intermediate reactivity or a so-called "dead-burn" material. Either form of magnesium oxide is of the relatively high bulk density type showing, in like particle size conditions, a density of about 35 to about 65 pounds per cubic foot.

The magnesium chloride decomposition product MgO, when a powder, may be mixed with powdered lithium salts in suitable mixing equipment such as a pug mill or a multiple arm tumbler or the powdered material may be slurried with lithium salt solution. When the product issues from the magnesium chloride decomposition kiln in pelletized form, the pellets may be ground and dry mixed with lithium salt or the lellets themselves may be treated with lithium salt solution.

Generally, the magnesium oxide is introduced in the form it issued from the decomposition kiln, i.e., pellets, into an autoclave. The pellets are soaked for a time in lithium salt solution and then the solution drained off. The material is then hydrated with the result that the pellets break down to a fine particle size product.

This hydration step may theoretically be carried out in the presence of water, water vapor or steam under a variety of conditions. Hydration at elevated temperatures and pressure may be accomplished, however, in a much shorter time utilizing steam. For example, a major portion, i.e., 80%, of the magnesium oxide may be hydrated at temperatures between about 150° C. and about 250° C. under steam pressures of about 100 pounds to about 350 p.s.i. in a matter of one to three hours. Hydration may be accomplished at lower temperatures, but at the lower temperatures the hydration reaction is materially slowed. Hydration treatment may be satisfactorily carried out in a continuous or batch operation, but in the instant case, the batch is preferred since both the soaking with lithium salt solution and hydration can be carried out in a single piece of equipment.

It is not essential to the success of the process that complete hydration of the magnesium oxide product be accomplished. It is sufficient if a major portion of the products hydrate, e.g., 60% to about 85% by weight, is reacted. The firing or burning of lithium salt treated and hydrated magnesium oxide may be carried out under proper conditions of atmosphere, time and temperature sequence to produce first a light burn product, following which the material is given a final calcining.

Temperatures in the first heat operation after hydration must be carefully regulated in order to obtain a product which develops the proper high density upon calcination. For this preliminary burning, temperatures in the range of about 500° C. and about 800° C. are generally utilized, with temperatures of about 550° C. to about 650° C. preferred. Material dried under identical conditions except as to temperature after pelletizing at 4500 p.s.i., when light burned at 400°, 500° and 600° C. and fired at 1300° C. for one hour, show a fired pellet density in gm./cm.$^3$ of 1.62, 2.41 and 3.31, respectively.

In the preferred mode of operation, the product heat treated at temperatures of 500° to about 800° C. is mixed with 2.5% by weight of water and pressed into pellets utilizing pressures of the order of 2000 to 5000 p.s.i.

Pellets are finish burned by calcining in suitable equipment such as a rotary kiln at temperatures above about 800° C. and preferably in the range between about 1200° C. to about 1500° C. for a period of about one-half hour to about two hours.

Of the group of compounds encompassed by the term "volatilizable or heat decomposable lithium salts," the most effective are the halogen salts, lithium chloride, lithium bromide and lithium fluoride. Other useful lithium compounds are lithium hydroxide, lithium carbonate, and other basic lithium compounds. The lithium salts, whether introduced as a powder or a solution, are added in quantities to produce a concentration of, for example, lithium chloride of between about 0.2% and about 1% and preferably between about 0.25% and about 0.75% by weight at the time the magnesium oxide mixture is autoclaved to effect hydration. There is some variation in the conditions for optimum effectiveness between the various salts. Lithium fluoride, for example, for the same salt concentration, induces sintering at a much lower temperature than lithium chloride, but requires a considerably longer heat treatment period to produce a final product of the same density, i.e., gm./cm.$^3$.

The following examples are given by way of illustration of the character of the invention, without any intention that the invention be limited thereto.

EXAMPLE I

Magnesium chloride hydrate was flaked on a drum dryer. The flaked material was fired in a rotary kiln at a temperature of about 550° C., and then calcined at 1600° C. to complete decomposition. The magnesium oxide product showed a purity of about 99% and had a bulk density of about 66 lbs./cu. ft., i.e., about 1.1 gm./cm.$^3$. This bulky product was divided into four portions, A, B, C and D.

Portion A was autoclaved for two hours at 300 p.s.i. saturated steam pressure. The autoclaved material was dried at approximately 600° C. Dry magnesium oxide material was converted to ¼ inch diameter by ¾ inch length pellets at a pressure of approximately 4500 p.s.i. These pellets were fired at approximately 1400° C. for one hour. The calcined material had a density of about 1.74 gms./cm.$^3$. Data on this product and the product of the later examples are shown in Table I where comparison is easily made.

EXAMPLE II

Portion B from Example I was autoclaved for two hours at 300 p.s.i. saturated steam pressure. The autoclaved material was slurried with sufficient lithium chloride solution so that upon evaporation of water, the product contained 0.75% lithium chloride by weight. The slurry was calcined at approximately 600° C. Calcined powder was mixed with 4% of water and pressed into pellets of ¼ inch diameter and ¾ inch length at a pressure of approximately 4500 p.s.i. These pellets were fired at approximately 1350° C. on the rotary kiln used to fire the material of Example I. The calcined material had a density of about 2.73 gms./cm.$^3$.

EXAMPLE III

Portion C from Example I was dry mixed with sufficient lithium chloride to produce in the mixture 0.75% by weight of lithium chloride. This mixture was autoclaved at 300 p.s.i. for two hours. After the hydrated product had been dried at approximately 600° C., it was mixed with 4% of water and pressed into pellets of ¼ inch diameter and approximately ¾ inch length at 4500 p.s.i. These pellets were fired from room temperature to approximately 1350° C. in one hour and then cooled. The calcined material had a density of about 3.0 gms./cm.$^3$.

EXAMPLE IV

Portion D from Example I was autoclaved for two hours at 300 p.s.i. saturated steam pressure. The autoclaved material was dried at 600° C. The dry MgO was slurried with sufficient lithium chloride solution so that upon evaporation of water, the product contained 0.75% lithium chloride by weight. The slurry was dried at approximately 600° C. Dry powder was mixed with 4% of water and compressed into pellets of ¼ inch diameter and ¾ inch length at a pressure of 4500 p.s.i. These pellets, like the pellets of the previous examples, were fired at 1350° C. in the rotary kiln. The calcined material had a density of about 2.53 gms./cm.$^3$.

EXAMPLE V

Magnesium oxide material produced by the decomposition of magnesium chloride hydrate, as in Example I, was slurried with lithium fluoride solution in quantity sufficient to produce in the mixture a concentration of 1% by weight of lithium fluoride. The mixture was autoclaved at 150 p.s.i. steam pressure and dried at a temperature of approximately 550° C. and the dry material mixed with 4% of water and pelletized to form pellets of ¼ inch diameter and ¾ inch length at a pressure of approximately 5000 p.s.i. The pelletized material was fired at 800° C. for about four hours. This calcined material had a density of about 2.86.

Comparison of operating conditions and results obtained may be made by reference to the following table.

*Table I*

| Test | Lithium Compound | | | Autoclave Pressure, p.s.i. | Firing Temp., °C. | Fired Density, g./cc. |
| --- | --- | --- | --- | --- | --- | --- |
| | Identity | Prop'n, wt. percent | Where Added | | | |
| Untreated, MgO. | | | | | | 1.1 |
| Ex. I | | | | 300 | 1,400 | 1.74 |
| Ex. II | LiCl | 0.75 | After autoclaving. | 300 | 1,350 | 2.73 |
| Ex. III | LiCl | 0.75 | Before | 300 | 1,350 | 3.0 |
| Ex. IV | LiCl | 0.75 | After | 300 | 1,350 | 2.53 |
| Ex. V | LiF | 1.0 | Before | 150 | 800 | 2.86 |

Study of the data indicates that mixing of MgO with lithium salts prior to hydrating results in markedly improved densification of MgO during a final calcining or heat treatment, and lowers the temperature at which a dense product is obtainable.

Having thus described my invention, what I claim is:

1. The process of increasing the density of dead-burned magnesium oxide prepared by thermal decomposition of magnesium chloride hydrate which comprises admixing said magnesium oxide with a lithium compound volatilizable under the firing temperature conditions thereafter employed, hydrating the mixture in a steam atmosphere at a pressure in excess of about 100 p.s.i., drying the hydrated mixture, and firing the dried mixture at a temperature in the range between about 800° C. and about 1500° C., whereby said magnesium oxide is densified and substantially all of said lithium compound is volatilized.

2. The process of increasing the density of dead-burned magnesium oxide prepared by thermal decomposition of magnesium chloride hydrate which comprises admixing said magnesium oxide with a lithium compound volatilizable under the firing temperature conditions thereafter employed, the proportion of said lithium compound in the resulting mixture being equivalent to between about 0.02 and about 0.16% by weight of lithium, hydrating the mixture in a steam atmosphere at a pressure in excess of about 100 p.s.i., drying the hydrated mixture, and firing the dried mixture at a temperature in the range between about 1200° C. and about 1500° C., whereby said magnesium oxide is densified and substantially all of said lithium compound is volatilized.

3. The process of claim 2, wherein drying of said hydrated mixture is effected at a temperature in the range between about 500° C. and about 800° C.

4. The process of claim 2 wherein hydration of said mixture is effected at a saturated steam pressure between about 100 and about 350 p.s.i.

5. The process of claim 2 wherein said lithium compound is a lithium halide salt.

6. The process of claim 2 wherein said lithium compound is lithium chloride.

7. The process of increasing the density of dead-burned magnesium oxide prepared by thermal decomposition of magnesium chloride hydrate which comprises admixing said magnesium oxide with lithium chloride in an amount sufficient to provide between about 0.2% and about 1% by weight of lithium chloride in the resulting mixture, hydrating the mixture in a saturated steam atmosphere at a pressure between about 100 and about 350 p.s.i., drying the hydrated mixture at a temperature in the range between about 500° C. and about 800° C., and firing the dry hydrated product at a temperature in the range between about 1200° C. and about 1500° C.

8. The process of claim 7 wherein the proportion of lithium chloride in said mixture is between about 0.25% and about 0.75% by weight.

9. The process of increasing the density of dead-burned magnesium oxide prepared by thermal decomposition of magnesium chloride hydrate which comprises admixing said magnesium oxide with sufficient lithium chloride to provide between about 0.2% and about 1% by weight of lithium chloride in the resulting mixture, hydrating the mixture for between about 1 and about 3 hours at a saturated steam pressure of between about 100 and about 350 p.s.i., drying the hydrated mixture at a temperature in the range between about 500° C. and about 800° C., pelletizing the dry hydrated mixture at pressures in the range between about 2000 and about 5000 p.s.i., and firing the pelletized material at a temperature in the range between about 1200° C. and about 1500° C.

References Cited in the file of this patent

UNITED STATES PATENTS

| | | |
|---|---|---|
| 396,693 | Hastings | Jan. 22, 1889 |
| 2,450,266 | Alexander | Sept. 28, 1948 |
| 2,641,529 | Austin | June 9, 1953 |
| 2,823,134 | Atlas | Feb. 11, 1958 |